United States Patent [19]
Jewett

[11] Patent Number: 4,606,422
[45] Date of Patent: Aug. 19, 1986

[54] COOLING AIR DELIVERY SYSTEMS

[75] Inventor: James W. Jewett, Dubuque, Iowa

[73] Assignee: Deere & Company, Moline, Ill.

[21] Appl. No.: 708,775

[22] Filed: Mar. 6, 1985

[51] Int. Cl.[4] ............................................. B60K 13/00
[52] U.S. Cl. .............................. 180/68.1; 55/385 B; 180/68.3
[58] Field of Search ............... 98/2.11; 123/41.57; 55/324, 327, 328, 385 B, DIG. 28; 180/68.1, 68.3

[56] References Cited

U.S. PATENT DOCUMENTS

| | | | |
|---|---|---|---|
| 2,881,860 | 4/1959 | Ternes | 55/385 B X |
| 3,043,390 | 7/1962 | Lattay | 180/68.1 |
| 3,249,172 | 5/1966 | De Lorean | 180/68.3 |
| 4,026,376 | 5/1977 | Gee | 180/68.1 |
| 4,212,659 | 7/1980 | Magrini | 55/385 B |

FOREIGN PATENT DOCUMENTS

| | | | |
|---|---|---|---|
| 844862 | 8/1960 | United Kingdom | 180/68.3 |
| 849909 | 9/1960 | United Kingdom | 180/68.3 |

Primary Examiner—John J. Love
Assistant Examiner—Michael Mar

[57] ABSTRACT

A cooling delivery system for a vehicle including a plurality of baffles mounted to the vehicle's engine compartment hood. A hood having a plurality of screens is pivotally mounted on the hood to cover the baffles in a down position. An air intake duct has a portion extending through the hood beneath the cover for receiving and conducting ambient air to a blower fan whereafter the ambient air is forced by the blower fan to traverse the vehicle's radiator.

2 Claims, 4 Drawing Figures

COOLING AIR DELIVERY SYSTEMS

BACKGROUND OF THE INVENTION

This invention relates to means of directing ambient air Through a heat exchanger associated with the drive train of an off-road vehicle.

Certain off-road vehicles, such as large excavators and loaders, locate the engine compartment rearwardly of the operator's station. Mounted rearward most in the engine compartment is a heat exchanger or radiator associated with the vehicle's engine. Mounted also within the engine compartment is a blower fan. The blower fan draws ambient air through openings in the engine compartment and propells the captured air through the radiator to exit through the engine compartment grille. The resultant air flow through the radiator permits heat transfer from the radiator to the traversing air. Because the ambient air entering the engine compartment must first traverse across the vehicle's engine, the air is preheated thereby reducing its heat transfer efficiency by approximately twenty to thirty percent (20–30%) from the ambient condition. Further, the air entering the engine compartment may carry airborne particulants or trash which can form radiator clogs, further reducing the radiator heat transfer efficiency.

SUMMARY OF THE INVENTION

It is an object of the present invention to present a means, particularly suited to off-road vehicles having a rear mounted engine compartment, for receiving and conducting ambient air to a fan such that the air does not encounter the vehicle's engine.

It is a further objective of the present invention to present a means for receiving and conducting ambient air which removes airborne trash from the ambient air prior to introduction of the air to the vehicle's radiator.

The rearwardly located engine compartment of off-road vehicles includes a cover pivotably mounted to the external surface of the engine compartment's hood. The cover encloses a pair of baffles fixably mounted to the top surface of the hood in spaced apart relationship. Screens form a portion of the top and opposite sidewalls of the cover extend longitudinally between the projections of the baffles. Located longitudinally beyond the respective baffle and having a portion extending vertically through the hood is a fan air intake duct. The fan air intake duct receives ambient air from the cover and conduits the air to a blower fan which propells the air so as to traverse the radiator. An engine respiration duct located forwardly relative to the baffles receives and delivers ambient air which has traversed the cover screens to the engine respiration system.

DESCRIPTION OF THE PREFERRED EMBODIMENT

Figure 1:
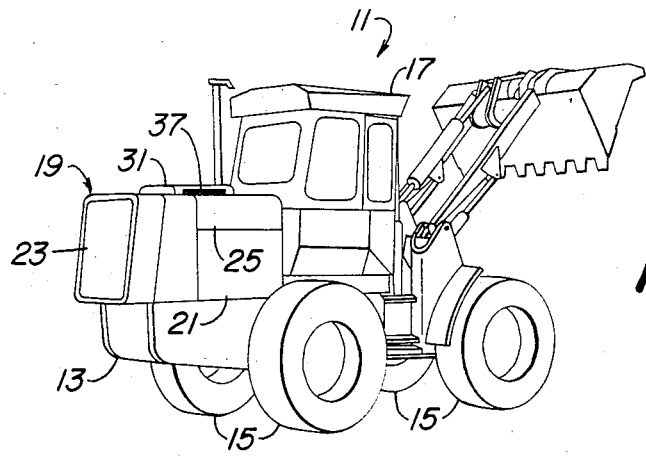
FIG. 1 is a prospective view of an off-road vehicle including a cover in accordance with the present invention.

Refer to FIG. 1, an off-road vehicle such as a large wheel loader, generally indicated as 11, includes a frame 13 supported by wheels 15. An operator's station 17 is forwardly located and fixably mounted to the frame 13 by any conventional means. An engine compartment 19 is fixably mounted by any conventional means to the frame rearward of the operator's station 17. The engine compartment 19 is composed of sidewall 21, a rearwardly located grille 23 and a hood 25 constructed in a generally conventional manner.

Figure 2:
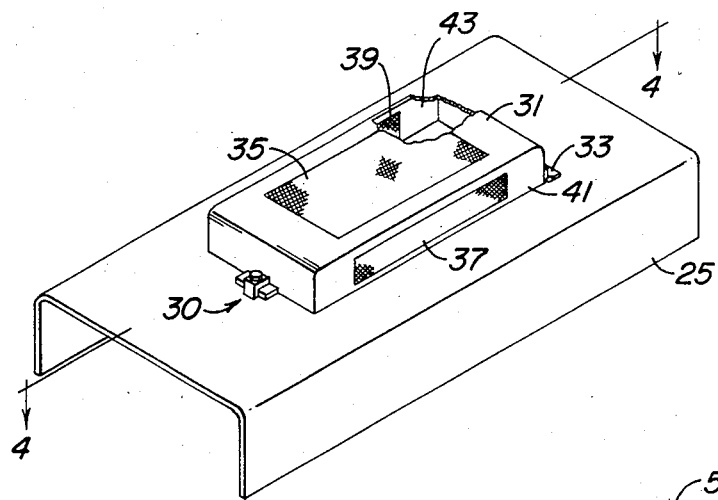
FIG. 2 is a prospective view of the vehicle's engine compartment hood and cover in accordance with the present invention.
Figure 4:
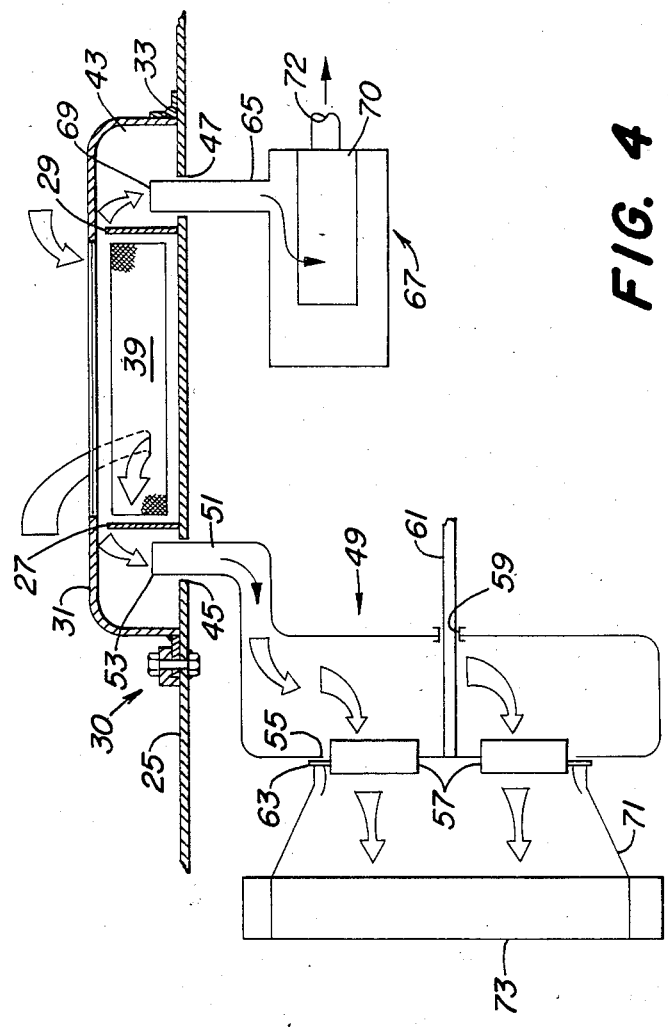
FIG. 4 is a schematic side view of the cooling air delivery system.

Referring more particularly to FIGS. 2 and 4, to accommodate the cooling air delivery system a first and second baffle 27 and 29, respective is fixably mounted on the top surface of hood 25 by any conventional means. The baffles 27 and 29 are in spaced apart relationship and have a transverse and vertical extension with respect to the hood 25. A cover 31 is pivotally mounted at one end by any conventional means such as by a hinge 33 to the top surface of hood 25. The cover 31 is positionable normally to enclose the baffles 27 and 29 in conjunction with the top surface of hood 25. The cover 31 can be secured in the normal position by any conventional means such by any conventional latch 30. A first screen 35 forms part of the top surface of cover 35, and, a second and third screens 37 and 39, respectively, form part of respective cover sidewall 41 and 43. The screens 35, 37 and 39 are located between the vertical and longitudinal projection of baffles 27 and 29. The longitudinal ends of baffles 27 and 29 are abutting to respective cover sidewalls 41 and 43. The baffles 27 and 29 are in vertical spaced apart relationship to the top of cover 31.

Figure 3:
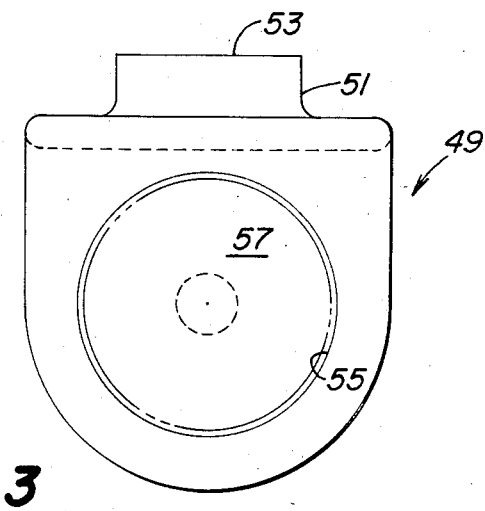
FIG. 3 is a frontal view of the fan air intake duct.

Referring to FIGS. 3 and 4, the hood 25 further includes a generally rectangularly shaped first opening 45 located rearward of baffle 27 and beneath cover 31 extending transversely across hood 25, and a generally rectangularly shaped second opening 47 located forward of baffle 29 and beneath cover 31 extending transversely across hood 25. A fan air intake duct 49 has a portion 51 which extends in part matingly through the first opening 45 and defines a duct entrance 53 residing within captured by cover 31 and hood 25. The fan air intake duct exit opening 55 is positioned closely around the peripheral path of fan blades 57. The fan blades 57 are mounted to a shaft 61 driven by an engine (not shown) mounted in the engine compartment 19 in a conventional manner. An opening 59 in the the air intake duct 49 permits the fan drive shaft 61 to journey therethrough. The air intake duct 49 is fixably mounted in the engine compartment 19 by any conventional means such as securing to radiator shroud mounted post 63.

A portion 65 of an engine respirator duct 67 extends matingly into opening 47 to reside within an area captured by cover 31 and hood 35. The portion 65 defines a duct entrance 69. The engine respirator duct 67 encapsulates a conventional air filter housing 70. An exiting conduit 72 journies from the filter housing 70 through the respirator duct 67 to the engine respirator in a conventional manner.

The cooling air delivery system operates to allow ambient air within the enclosed area defined by cover 31 and hood 25 through screens 35, 37 and 39. Large airborne particulents are denied entry by screen 35, 37 and 39. A portion of the ambient air is drawn between the baffle 27 and hood 31 and received in fan air intake duct 49 through entrance 53. The fan air intake duct 49 directs the received air to fan 57, whereafter, the air is propelled through the fan shroud 71 and radiator 73 to exit from the engine compartment 19 through grill 23 in a conventional manner. It is noted, that the fan shroud 71 and radiator 73 are fixably mounted in the engine compartment in a conventional manner.

Another portion of the ambient air admitted by screens 35, 37 and 39 is drawn between cover 31 and baffle 29 into the engine respirator duct 67 through entrance 69. The received air is allowed to traverse the air filter 70 and, thereafter, exit through conduit 72 in a conventional manner to be delivered to the engine respirator.

It is further noted that the placement of baffle 27 and 29 relative to screens 35, 37 and 39, permit the sedimentation of airborne particulates between baffles 27 and 29 which were able to traverse screens 35, 37 and 39. Therefore, the propensity for ambient particulants sufficient in size to cause radiator clogging to be transported to the radiator is substantially reduced. The cover 31 can be pivoted about hinge 33 to allow the periodic removal of sediment.

I claim:

1. A cooling air delivery system for a vehicle, said vehicle having an engine compartment enclosing an engine driving fan having radially spaced blades located opposite a radiator, and a shroud mounted between said radiator and said fan, comprising:

said compartment having a hood, at least a first and second baffle fixedly mounted to the external surface of said hood; said baffles being in longitudinal spaced apart relationship, extending transversely across said hood and projecting upwardly therefrom; a first generally rectangular shaped opening in said hood rearward of said baffles, and a second generally rectangular shaped opening in said hood forward of said baffles; a cover pivotally mounted to said hood such that in a first position said cover encloses said baffles and said first and second openings in said hood and in a second position said baffles and said first and second openings are exposed; said cover being in a vertically spaced apart relationship to said baffles and having a plurality of screened openings forming part of said cover and extending between the said projecting baffles for admitting air into said cover.

2. A cooling air delivery system as claimed in claim 1 further comprising:

an air intake duct having a first portion defining an entrance, said first portion extending matingly through said first opening, and a second portion defining an exit which extends circumferentially around the peripheral path of said fan blades; an engine respirator duct having a portion defining an entrance extending through said second opening in said hood and encapsulating an air filter, an exit duct extending into said respirator duct from said engine; means for fixably supporting said air intake duct and said respirator duct in said engine compartment.

* * * * *